United States Patent [19]

Mori

[11] Patent Number: 4,815,815
[45] Date of Patent: Mar. 28, 1989

[54] DEVICE AND A METHOD OF DIRECTING LIGHT ENERGY TO A PREDETERMINED AREA IN THE SEA

[76] Inventor: Kei Mori, 3-16-3-501, Kaminoge, Setagaya-ku, Tokyo, Japan

[21] Appl. No.: 624,802

[22] Filed: Jun. 26, 1984

Related U.S. Application Data

[63] Continuation of Ser. No. 205,573, Nov. 7, 1980.

[30] Foreign Application Priority Data

Nov. 13, 1979 [JP] Japan .............................. 54-146964
Nov. 22, 1979 [JP] Japan .............................. 54-151393

[51] Int. Cl.[4] ............................................. G02B 6/04
[52] U.S. Cl. ............................... 350/96.24; 350/96.10
[58] Field of Search ................ 350/96.10, 96.23, 96.24

[56] References Cited

U.S. PATENT DOCUMENTS

| | | | |
|---|---|---|---|
| 3,157,089 | 11/1964 | Menefee | 350/96.10 |
| 3,526,880 | 9/1970 | Filippazzi | 350/96.10 |
| 3,749,901 | 7/1973 | Clough | 350/96.24 |
| 4,137,869 | 2/1979 | Kipping | 119/4 |
| 4,333,704 | 6/1982 | Steinberg | 350/96.23 |
| 4,501,084 | 2/1985 | Mori | 43/17.5 |

FOREIGN PATENT DOCUMENTS 0015339  2/1977  Japan .................................. 350/96.10

OTHER PUBLICATIONS

"Fiber Optic Converter Illumination Apparatus", Tompkins, IBM Technical Disclosure Bulletin, vol. 16, No. 9, Feb. 1974.

Primary Examiner—William L. Sikes
Assistant Examiner—Akm E. Ullah
Attorney, Agent, or Firm—Merchant, Gould, Smith, Edell Welter, & Schmidt

[57] ABSTRACT

A device for directing light energy to a predetermined area in the sea, is disclosed. The device comprises an optical means for capturing light energy and a plurality of optical fibers, a length of said optical fibers which are bound together in an optical fiber cable, each of said fibers having a beam inlet portion and a beam outlet portion, said beam outlet portion being arranged in the atmosphere so that light beams above the surface of the sea are captured, said fiber beam outlets being distributively arranged in the sea for providing said light energy to a predetermined area.

11 Claims, 5 Drawing Sheets

DEVICE AND A METHOD OF DIRECTING LIGHT ENERGY TO A PREDETERMINED AREA IN THE SEA

This is a continuation of application Ser. No. 205,573, filed Nov. 7, 1980.

DESCRIPTION OF THE INVENTION

The present invention relates to a deivce and a method of directing light energy to a predetermined area in the sea.

Various kinds of plants or fish and shellfish are growing or living in the sea, and they serve as means of nutrition for mankind. It is the present situation that raising of those plants, and the preserving of those fish and shellfish from foregoing attack, are not carried out effectively.

An area of the ocean floor amounts to several times that of the land. Moreover, the soil of the ocean floor is fertile. Therefore, it is evident that people could prepare for times of difficulty by growing and obtaining food by using the ocean floor more effectively.

At present, a study for utilizing the ocean floor as a forming area is being carried out. However, the depth of the ocean flow farm which is being planned now is about from 8 to 13 meters from the surface of the ocean. The area beneath this depth is too deep to obtain sufficient solar energy for successfully raising plants. In this connection, the strength of the total amount of sunbeams penetrating the sea is decreased to about 50% for every one meter in depth. Consequently, the amount of sunbeams in a place of 8 to 13 meter from the surface of the sea, would be decreased to $10^{-8}$ to $10^{-13}$ thereof, and would be farther decreased in accordance with the degree of the muddiness of the sea. Finally, it would be impossible to raise plants in the sea sufficiently due to lack of light.

Under the above-mentioned circumstances, the inventor of the present invention carried out a wide range of systematic studies for utilizing solar energy effectively, it was found that when a plurality of optical fibers of which beam outlets being distributively arranged in the sea were effective for growing plants in the sea and for protecting or capturing fish et al.

An object of the present invention is to provide a device for directing solar energy to a predetermined area in the sea.

Another object of the present invention is to provide a method of directing solar energy to a predetermined area in the sea.

According to the present invention, there is provided a device for directing light energy to a predetermined area in the sea, comprising an optical means for capturing light energy and a plurality of optical fibers, a length of said optical fibers which are bundled together in an optical fiber cable, each of said fibers having a beam inlet portion and a beam outlet portion, said beam inlet portions being arranged in the atmosphere so that the sunbeams above the surface of the sea are captured, said beam outlet portions being distributively arranged in the sea for providing said light energy to a predetermined area.

Also, according to the present invention, there is provided a method of directing light energy to a predetermined area in the sea, by using an optical means and a plurality of optical fibers, a length of said optical fibers which are bundled together in an optical fibers cable, each of said fibers having a beam inlet portion and a beam outlet portion, comprising the steps of:
 capturing light energy through the optical means;
 introducing light energy into the beam inlet portions of said fibers, which are located in the atomosphere;
 transferring light energy to the beam outlet portions of said fibers, which are located in the sea;
 providing for the diffusion of said light energy in a predetermined area in the sea from the diffusion points which are situated below the beam outlet portions.

Consequently by using a device or method of the present invention, light energy such as solar energy is captured above the sea or on land through the optical means, then directed to the optical fibers in an optical fiber cable, then the directed light is introduced into the sea through optical fibers, and then said light energy is provided to the predetermined area such as a seabed or ocean floor or rock in the sea to light those places. Therefore, various kinds of plants such as algae, seaweed growing on the above places could be better grown by the light energy provided through the optical fibers.

Furthermore, according to the present invention solar energy might be provided to deep places in the sea or to dark places in the sea where natural light can not reach. Therefore, plants would be able to be grown in such places where plants could not be grown before.

Furthermore, according to the present invention artificial light can be provided to the above-mentioned places when sunbeams are not available, for example, at night or on very cloudy days. Therefore, the supply of light energy to the plants will not be interrupted so that said growing plants in the sea do not wither.

The present invention may be more fully understood from the description of preferred embodiments of the invention presented below, together with the accompanying drawings.

BRIEF DESCRIPTION OF THE DRAWINGS

In the drawings:

In FIG. 1, A is an optical means for capturing, light energy which comprises at least one lens 1. The lens 1 is supported by supporting frames 2. To these supporting frames an optical fiber cable 3 is installed.

The optical means A and the supporting frames 2 may be housed in a transparent capsule 4 which is in the shape of a sphere. The lens 1 housed in a capsule 4 may be rotated to follow the sun as the sun moves in order to capture solar energy very effectively together with the supporting frames 2 on an appropriate means.

The transparent capsule 4 is set on a buoy 5 which is provided with floats.

Figure 1:
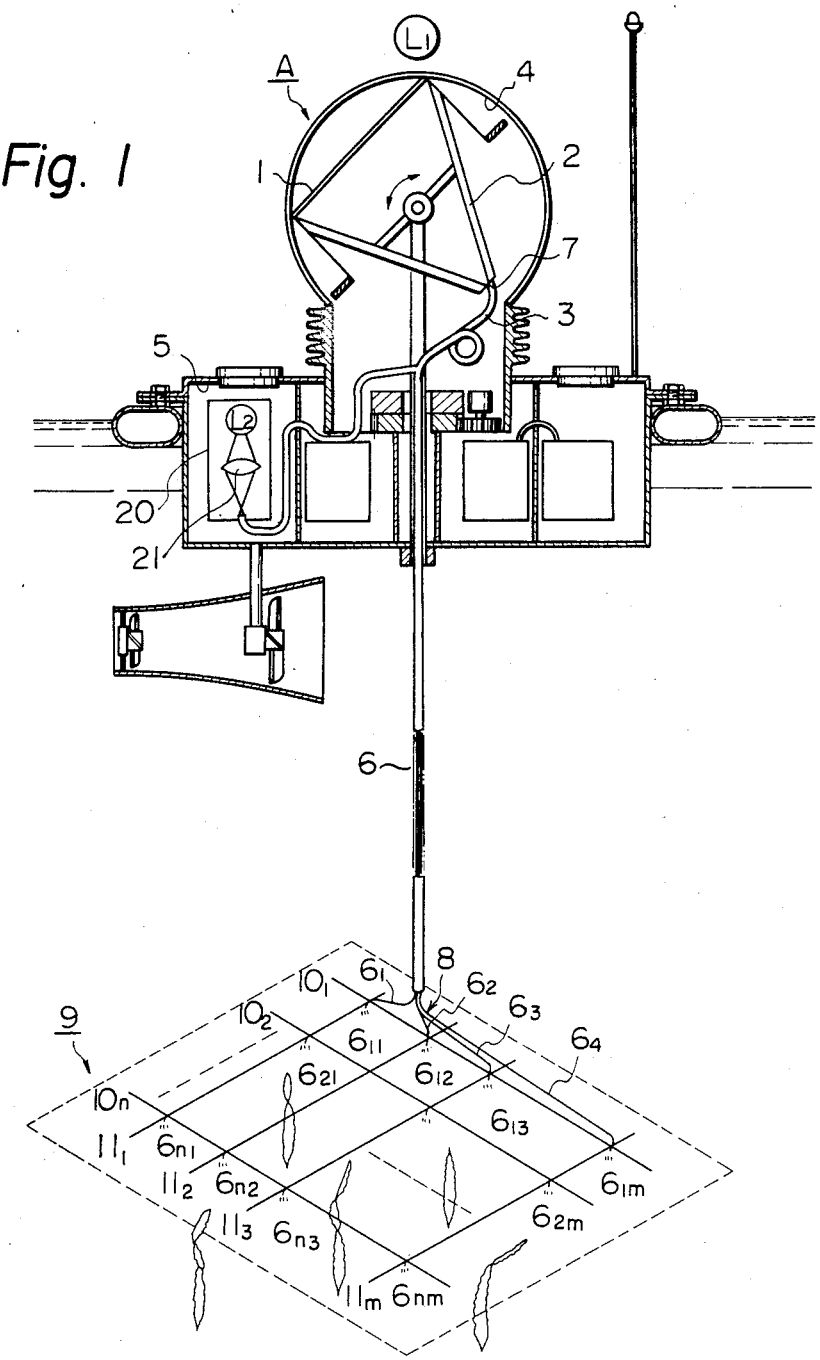
FIG. 1 is a diagrammatic illustration of a device suitable for carrying out an embodiment of the present invention.

Natural light is shown by reference $(L_1)$ in FIG. 1. An artificial light generating device 20 is arranged in the buoy 5. The device 20 includes an artificial light source such as xenon lamp as well as He-Ne and Ar laser generators, which is shown by reference $(L_2)$ in FIG. 1 and at least one lens 21.

A plurality of optical fibers 6, portions of which fibers are bound together in the aforementioned optical fiber cable 3. Each of the optical fibers 6 has a beam inlet portion 7 at the one end of the optical fiber cable 3 and also has fiber beam outlet portion 8 comprising distributively arranged light energy diffusion points.

As is shown in FIG. 1, said fiber beam inlet portions are positioned in the atmosphere so that the light beams above the surface of the sea are captured. Each of the beam outlet portions 8 is distributively arranged in the sea for diffusing said light energy into a predetermined area.

Reference number 9 designates a net in which the optical fibers 6 are fixed stationary at a selected point. The net 9 is composed of multiple fibers $10_1 \sim 10_n$ horizontally meshed with lateral fibers $11_1 \sim 11_m$. On the net optical fibers 6 are installed. For instance, the net 9 and the optical fibers 6 are tied together by strings 16 or an appropriate means. Also, the optical fibers 6 are installed in the net 9 by passing randomly in a continuing S-shape, mostly parallel to the lateral strings, and crisscrossing with other optical fibers randomly passing through the strings of the net in a continuing S-shape and mostly parallel to the horizontal strings.

The optical fibers 6 are provided with a plurality of spaced natural light energy or manufactured light energy diffusion points $6_{11} \sim 6_{mn}$ (in future all light energy diffusion points will be abbreviated to L.E.D. points). In order to form a plurality of spaced L.E.D. points, n×m number of optical fibers are used, and those fiber endings may be positioned so that through the plurality of spaced L.E.D. points, solar energy or light energy is diffused into a predetermined area in the sea. Alternatively, n number of optical fibers (indicated by $6_1 \sim 6_n$) are used to form L.E.D. points by the following procedure. L.E.D. points $6_{11} \sim 6_{n1}$ are formed by removing part of the clad layer 16 at points $6_{11} \sim 6_{n1}$ (see reference numeral 15 in FIG. 3) of the optical fiber indicated by reference numer $6_1$. Similarly, L.E.D. points $6_{12} \sim 6_{n2}$ are formed by removing part of the a clad layer at points $6_{12} \sim 6_{n2}$ of the optical fiber indicated by number $6_2$. By repeating the above described procedure, L.E.D. points $6_{1m} \sim 6_{nm}$ are formed at points $6_{1m} \sim 6_{nm}$ of the optical fiber indicated by reference number $6_m$. If desired, the above-mentioned L.E.D. points can be formed by removing part of the clad layer 16 and adhering an appropriate transparent material 14 which has a higher index of refraction than that of the clad layer and the same or a higher index of refraction than that of the core material 17, which transparent material 10 is adhered to the place from where the layer has been removed.

However, it is not necessary to form L.E.D. points orderly as is shown in FIG. 1. Alternatively, L.E.D. points may be formed randomly on the whole net at an appropriate distance. In the latter case, the light irradiating from the L.E.D. points is diffused into a given area of the sea so that the desired object might be fully attained.

Furthermore, in case this invention is utilized for growing plants in the sea, it is not always necessary to use a net, instead of this net the optical fibers are fixed directly to natural objects for example, rocks in the sea, or said fibers can also be installed on piles or a fence in the sea which has been set up in advance.

Figure 3:
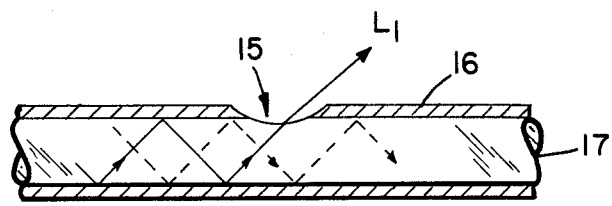
FIG. 3 is a partial sectional view of the preferred optical fiber.

FIG. 3 illustrates a light energy diffusion point (L.E.D.) 15 shown where a portion of the clad layer 16 is removed from the core material 17. The clad layer 16, the core material 17 and the L.E.D. 15 are described as shown.

Figure 4:
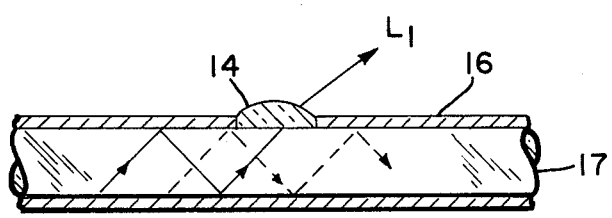
FIG. 4 is a partial sectional view of an optional optical fiber.
Figure 5:
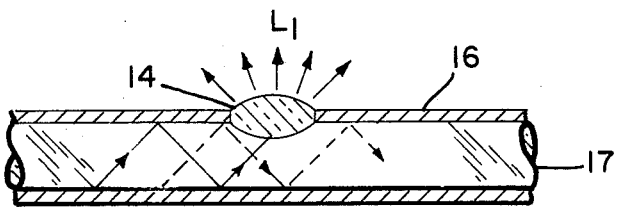
FIG. 5 is a partial sectional view of a second optical optical fiber.

FIG. 4 illustrates an L.E.D. where a portion of the clad layer 16 has been removed and transparent material 14 having a higher index of refraction that that of the clad layer has been installed. Similarly, FIG. 5 illustrates an L.E.D. having a transparent material 14 affixed where the clad layer 16 has been removed.

Figure 6:
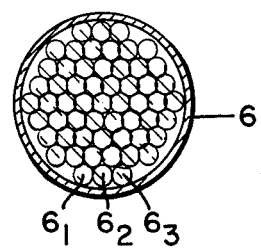
FIG. 6 is a cross sectional view taken through a plurality of optical fibers.

FIG. 6 shows a cross-sectional view through the optical fiber 6 showing individual fibers $6_1$, $6_1$, and $6_3$.

Figure 7:
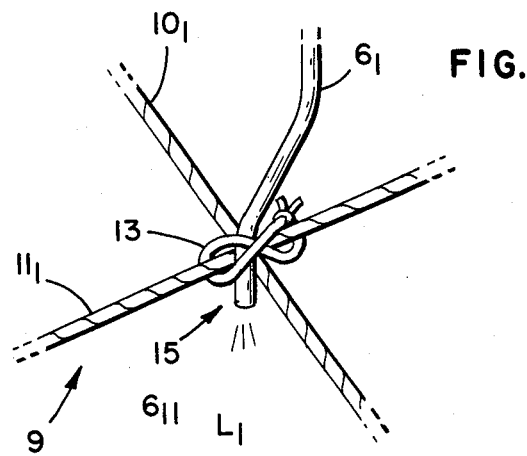
FIG. 7 is a partial view of the device shown in FIG. 1 on a very enlarged scale showing the net of the present invention.
Figure 8:
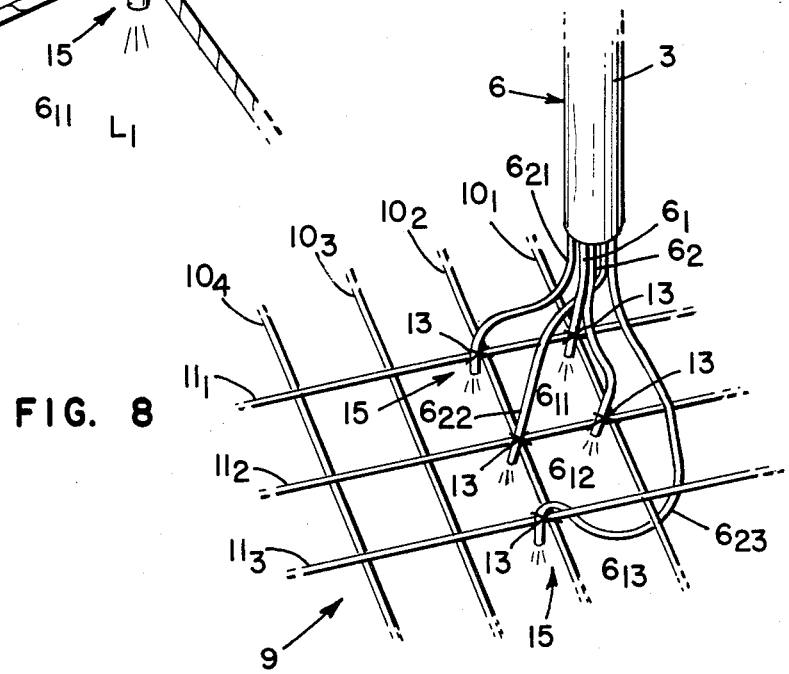
FIG. 8 is a partial schematic view of the net in FIG. 1 shown on an enlarged scale.

FIG. 7 shows a portion of the net 9 having fibers $10_1$ and $11_1$ with optical fiber $6_{11}$, tied to the net by string 13. Light $L_1$ is emitted from the end of fiber $6_{11}$ through L.E.D. 15, and is shown by hair-like lines which also appear in FIGS. 1 and 2. Similarly, FIG. 8 shows a plurality of optical fibers attached to the net by strings 13.

Figure 9:
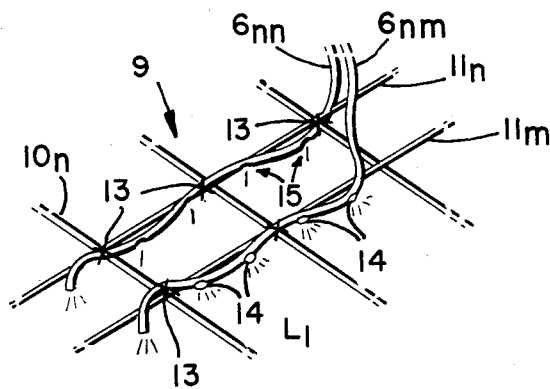
FIG. 9 is a partial schematic view of an optical embodiment of the present invention, showing the optical fibers of FIG. 4 and FIG. 5 affixed to a net.

FIG. 9 shows a plurality of L.E.D. points with those on optical fiber $6_{nn}$ having portions of the clad layer removed and emitting light $L_1$ at the ends of the optical fibers and along the lengths thereof. Fiber $6_{nn}$ corresponds to the fiber shown in FIG. 3. Optical fiber $6_{nm}$ has L.E.D. points including transparent material attached to the fiber where the clad layer has been removed. Fiber $6_{nm}$ corresponds to the fiber shown in FIG. 5. The optical fibers are affixed to the net by string or appropriate means.

Figure 10:
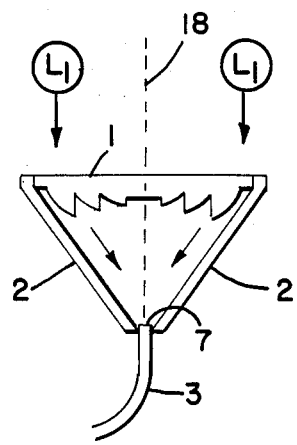
FIG. 10 is a partial schematic view of the optical lens portion of the present invention.
Figure 11:
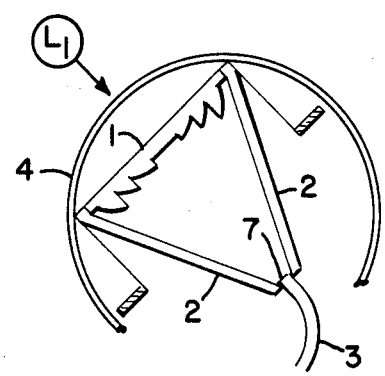
FIG. 11 is a partial schematic view of the lens portion of the present invention housed within a capsule.
Figure 12:
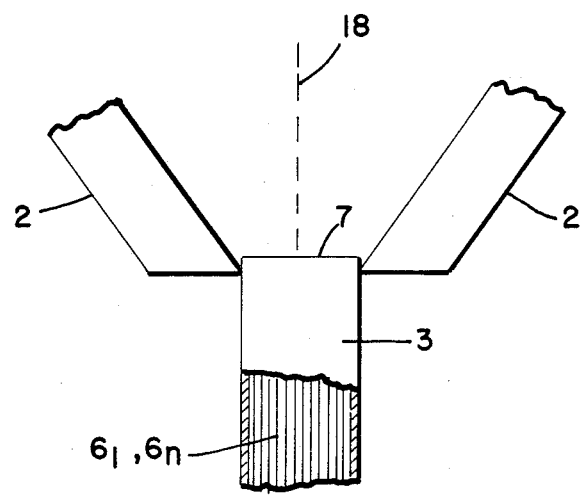
FIG. 12 is a partial side view of the beam inlet portion of the present invention shown on an enlarged scale.

FIGS. 10 through 12 show further constructional details of the lens 1 and the coupling of the lens to the optical fiber cable 3. The lens 1 is shown as a fresnel lens. The lens 1 has an axis 18 passing perpendicular to the lens. The captured light will be focused along the axis 18 of the lens and is held in this position by the supporting frames 2. The beam inlet portion 7 of fiber cable 3 is held at the focal point of lens 1. The focal point of the lens is along the axis 18 a distance equal to the focal length of the lens.

OPERATION OF THE INVENTION

In the preferred embodiment of the present invention illustrated in FIG. 1, solar energy is captured by an optical means A and said energy is introduced into the beam inlet portion 7 of a plurality of optical fibers 6, then said energy is transferred to the beam outlet portions of said fibers, which are located in the sea, then the energy is diffused distributively from the L.E.D. points $6_{11} \sim 6_{nm}$.

In this way, solar energy captured above the sea or on land is transferred to the sea, so that it promotes growth of plants in the sea.

As is described above, the intensity of radiation decreased by one half for every one meter distant from the surface of the sea. Therefore, in case the light transmitting efficiency of the whole device is 25 percent, the intensity of radiation on an area which is eight meters from the surface of the sea, can illuminate the area $2^6$ times as large as the face area of lens 1. Also, the intensity of radiation at a depth of thirteen meters from the surface of the sea can illuminate an area of $2^{11}$ times as large as the area of lens 1. Consequently, the intensity of radiation at a dpeth of thirteen meters from the surface of the sea could illuminate an area of about 200 m$^2$ by using a Fresnel lens which has a face area of about 0.1 m$^2$.

In other words, as is described above, the total amount of sunlight reaching a certain point in the sea decreases about 50% for every meter in depth. Therefore, assuming the light transmitting efficiency of the device and method of the present invention is 25%, a lens could illuminate an area $2^6$ times as large as its face area to an intensity equivalent to tht of 8 meters from the surface of the sea or an area $2^{11}$ times as large as its face area to an intensity equivalent to that of 13 meters from the surface of the sea. Consequently, a Fresnel lens which has a face area of about 0.1 m$^2$ could illuminate an area of about 200 m$^2$ to an intensity equivalent to that 13 meters from the surface of the sea.

As is obvious from the above mentioned description, the present invention will enable people to enlarge greatly the space for growing plants in the sea and also promote the growth of plants already in the sea.

SECOND EMBODIMENT

Figure 2:
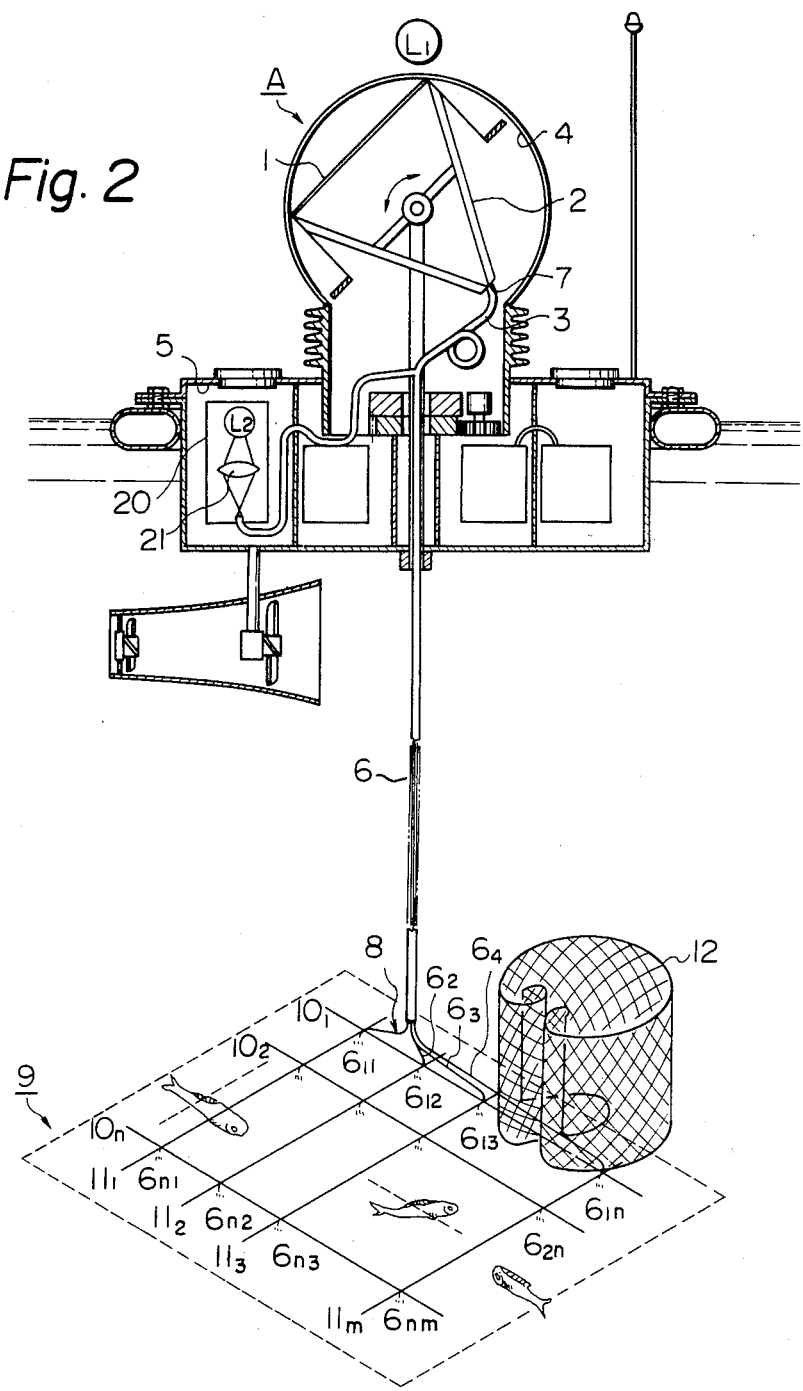
FIG. 2 is a diagrammatic illustration of a device suitable for carrying out an another embodiment of the present invention.

Another preferred embodiment of the present invention is illustrated in FIG. 2.

In FIG. 2, the elements which are the same as those of FIG. 1 are denoted by the same references. In this embodiment, natural light as well as artificial light from He-Ne laser, Ar laser and a xenon lamp may be used as source of light. Artificial light is shown by reference $L_2$ in FIG. 2. Light-diffusion portions on the optical fibers may be used as L.E.D. points, more preferrably optical fiber endings may be used for catching fish. A fish-catching net 12 is installed near the net 9.

as will be understood from the description of the above mentioned embodiment, seaplants such as algae can be grown, so that fish gather around the algae grown by the solar energy.

It was recognized that the response of fish varies with the type of irradiated light used. For example, if natural light was irradiated from the L.E.D. points, some types of fish gathered attracted by the light, other types scatter repelled by the light, still other types do not show any reaction to the light.

Generally, fish have a tendency to scatter quickly in an agitated manner if a blue colored light series is used. On the other hand those that have a tendency of being indifferent, gather at the light if a red color series is used. In fact, many fish scattered in an agitated manner when lights from an Ar laser which emit light waves in a blue color series, were used. Also many fish scattered when the light of a xenon lamp which includes ultraviolet rays was used. On the other hand, when lights from He-Ne lasers which were a red color series were used, some fish gathered showing some interest, but many fish did not respond to the light. Consequently, a desired type of fish could be gathered, protected and nurtured by selecting the suitable light source and using said light. Also, by occasionally selecting the appropriate optical fibers in an optical fiber cable and transferring the light to only one selected optical fiber among the optical fibers by a computer control system, the scope and the position of the lighting could be changed so as to lead the fish which gather in or around the net 9 to the fish-catching net 12. In order to catch the fish more effectively, the fish catcing net 12 is provided with optical fibers 6 to transfer the above mentioned lights, if necessary.

The state of fish gathering in the net 9 as well as the fish-catching net 12 can be monitored by a submersible television camera, then the picture information thereof can be observed by a television set on land. Therefore, catching fish in moderation, can be viewed by means of a television camera system.

In this way, fish and shellfish can be effectively protected, nurtured and captured in moderation. For directing fish gathering in a net 9 into the fish catching net 12, it is preferable that the light be red using a helium laser and the light be blue using an argon laser, are provided one after the other from the light diffusion points to the predetermined area.

Being obvious from the above description, fish can be gathered and caught in moderation according to the present invention.

While the invention has been described with reference to specific embodiments chosen for purposes of illustration, it should be apparent that numerous modifications could be made thereto by those skilled in the art without departing from the basic conception and scope of the invention.

I claim:

1. A device for directing light energy to a predetermined area in the sea comprising: an optical means affixed to a floating buoy for capturing light energy and a plurality of optical fibers, a length of said optical fibers bound together in an optical fiber cable, each of said fibers having a beam inlet portion and a beam outlet portion, said beam inlet portions being arranged in the atmosphere so that light beams above the surface of the sea are capatured, said beam outlet portions being distributively arranged in the sea for providing said light energy uniformly over a predetermined area in sufficient intensity to grow plants, each said beam outlet portion including a light diffusion point, each said light diffusion point spaced from the light diffusion points of the respective optical fibers the beam outlet portion of at least one of said optical fibers having a plurality of spaced diffusion parts, said optical fibers being affixed to a net having a plurality of horizontal fibers meshed with a plurality of lateral fibers, so that said diffusion points form a substantially planar lattice pattern.

2. A device as claimed in claim 1, wherein the optical means comprises at least one lens.

3. A device as claimed in claim 1, wherein said light diffusion points are formed by removing part of the clad layer at at least one intermediate point on the optical fiber.

4. A device as claimed in claim 1, wherein at least one of the optical fibers comprises the beam outlet portion having at one end thereof a single light-diffusion point.

5. A device as claimed in claim 1, wherein said light energy is solar energy.

6. A device as claimed in claim 1, wherein said light energy is artificial light energy.

7. A method of illuminating a predetermined area in the sea, by using an optical means affixed to a floating buoy and a plurality of optical fibers, a length of said optical fibers bound together in an optical fiber cable, each of said fibers having a beam inlet portion and a beam outlet portion said beam inlet portion being arranged in the atmosphere, said beam outlet portion being distributively arranged in said predetermined area in the sea, each said beam outlet portion including a light diffusion point, each said light diffusion point spaced from the light diffusion points of the respective optical fibers, the beam outlet portion of at least one of said optical fibers having a plurality of spaced diffusion points, said optical fibers being affixed to a net having a plurality of spaced substantially parallel horizontal fibers meshed with a plurality of spaced substantially parallel lateral fibers, so that said diffusion points form a substantially planar lattice pattern, comprising the steps of:

capturing light energy through the optical means;

introducing light energy into the beam inlet portions of said fibers, transferring light energy to the beam outlet portions of said fibers, and;

diffusing said light energy through said substantially planar lattice patterned diffusion points to illuminate said area with a sustantially uniform field of illumination.

8. The method of claim 7 further comprising the step of: using at least one lens to capture said light energy.

9. The method of claim 7 further comprising the step of: capturing solar energy.

10. The method of claim 11 further comprising the step of: using a He-Ne or Ar laser generator and a xenon lamp to produce said light energy.

11. The method of claim 7 further comprising the step of: using artificial lights to produce said light energy.

* * * * *